Aug. 3, 1937.  R. L. WATERS  2,089,142

BOAT ELEVATOR AND FISH LADDER

Filed Feb. 24, 1937  2 Sheets—Sheet 1

Inventor
Ray Waters
By
Attorney

Aug. 3, 1937.                R. L. WATERS                2,089,142
                      BOAT ELEVATOR AND FISH LADDER
                       Filed Feb. 24, 1937         2 Sheets-Sheet 2
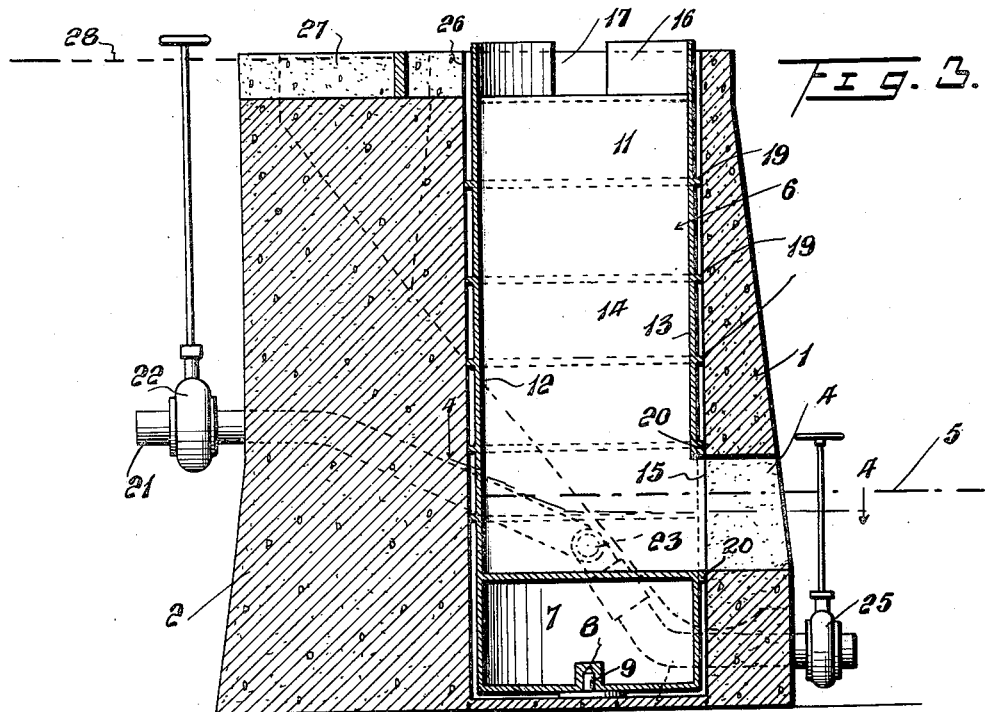
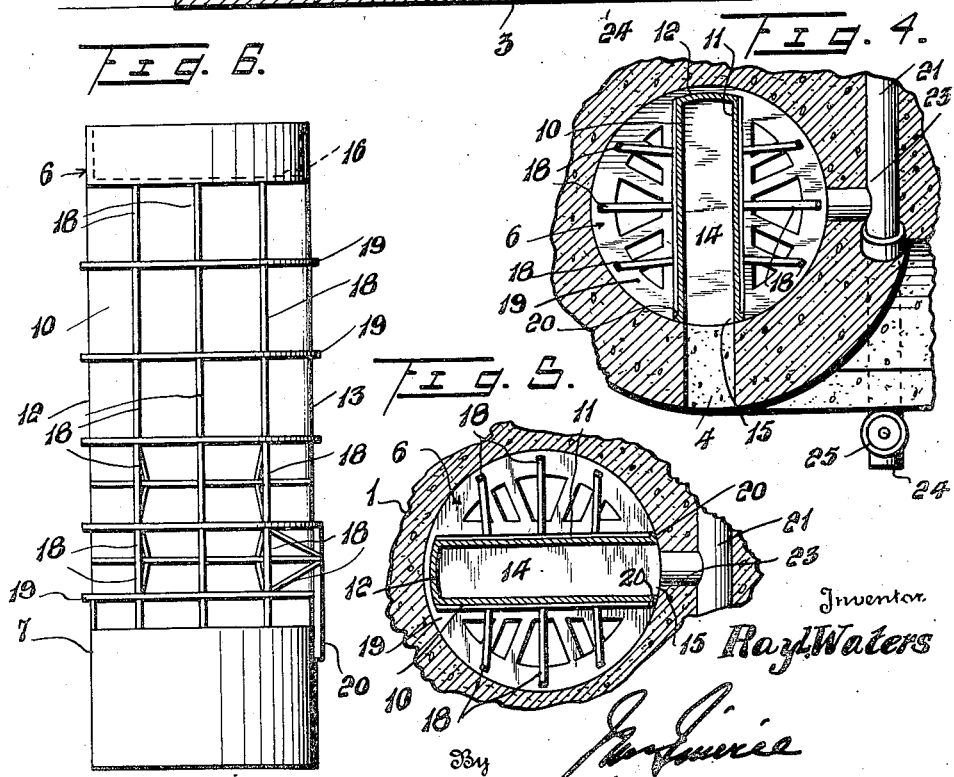
Inventor
Ray Waters Patented Aug. 3, 1937

2,089,142

UNITED STATES PATENT OFFICE 2,089,142

BOAT ELEVATOR AND FISH LADDER

Ray L. Waters, Mason City, Wash.

Application February 24, 1937, Serial No. 127,536

8 Claims. (Cl. 61—21)

This invention is directed to an improved boat elevator and fish ladder, designed particularly for use where the difference in water levels to be negotiated is very considerable, as for example where dams of considerable height have been erected in a navigable stream.

It is well known that for the purpose of producing economic power, many dams have been erected and are being erected in navigable streams in the United States. As these dams are ordinarily of very considerable height, the problem of transferring boats and small vessels from one level to the other has not yet been commercially and practically solved. Of course, it is recognized that a conventional lock system could be made to answer the purpose, but the difference in levels of the water in the stream would require such an extended complicated lock system as, from the standpoint of original and continued operating expense, to be practically prohibitive. Furthermore, these dams constitute a menace in some instances to the fishing industry. For instance, the contemplated dam in the Columbia River would prevent the movement of salmon up the river to their usual spawning ground, and would thus virtually kill what has become one of the most important and valuable industries in the fishery line in the United States.

The primary object of the present invention, therefore, is the provision of a unit construction built immediately adjacent the dam, either as an integral or additional structure, which would provide for the convenient transfer of boats and small vessels from one level to the other in an extremely efficient and convenient manner.

A further object of the invention is the provision of a construction which, in addition to serving as an effective boat elevator, may be used with equal facility for the transfer of fish from one level of the river to the other, to thus permit the fish to reach and return from their natural spawning ground.

A further object of the invention is the provision of a construction involving a fixed cylindrical body arranged on the low water side of the dam and supported on the dam foundation. This body is formed with an entrance opening extending sufficiently above and below the water level on the low side of the dam as to permit the free entrance of all boats and vessels designed to be handled. A cylinder is mounted for rotation within the cylindrical body and formed with an entrance opening which may register with the entrance opening of the body to permit the boat or vessel to reach the interior of the cylinder. The cylinder, which is capable of rotation, is moved to a particular position to cause the opening in the cylinder to be sealed against water flow. In elevating the boat or vessel within the cylinder, water is permitted to flow from the water on the high side of the dam, gradually filling the cylinder, from which of course it cannot escape, and gradually floating the boat or vessel within the cylinder to a level commensurate with the height of the water on the high side of the dam. The boat or vessel is then transferred around the dam proper by a relatively short conventional lock construction. In the transfer of boats or vessels from the high side of the dam to the low side thereof, the above operation is reversed in an obvious manner.

In the use of the construction as a fish ladder, fish are admitted through the entrance opening and the water level gradually raised, so that the fish may find their way into the water on the high side of the dam and continue their travel up the river.

The invention is illustrated in the accompanying drawings, in which:

Figure 3 is a vertical sectional view taken at right angles to the width of the dam, showing the improved construction.

Figure 4 is a transverse section on the line 4—4 of Figure 3.

Figure 5 is a similar view showing the inner cylinder in a position to receive or discharge water and sealed against the water of the lower level.

Figure 6 is a side elevation of the inner cylinder.

Figure 1:
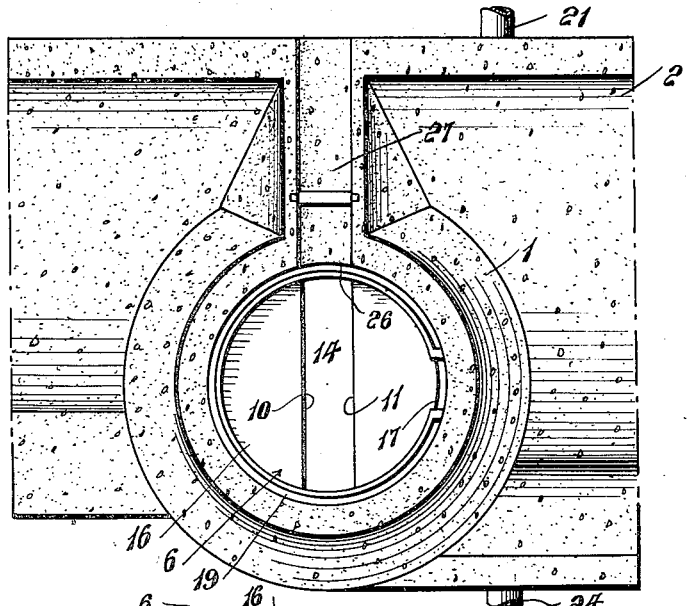
Figure 1 is a plan view showing the improved boat elevator and fish ladder arranged in connection with a dam.
Figure 2:
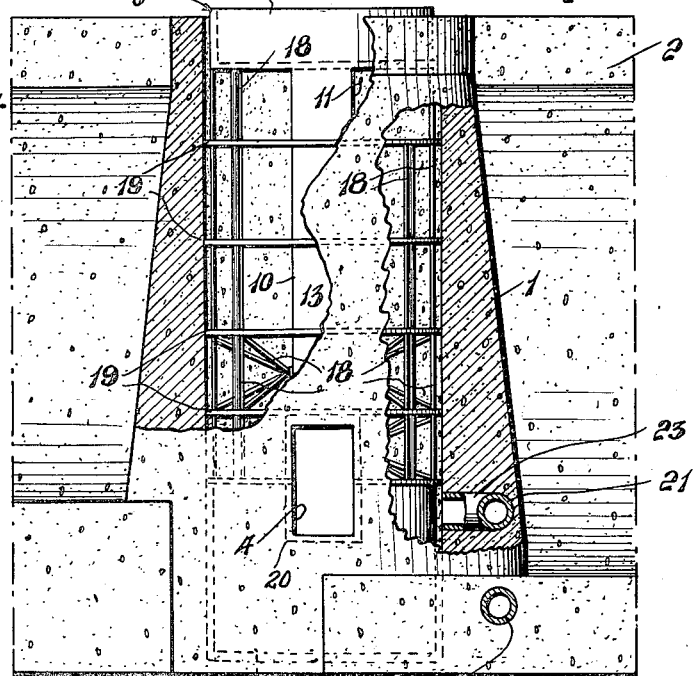
Figure 2 is a broken vertical section, partly in elevation, of the same, the line of section being parallel to the dam.

The improved boat elevator and fish ladder comprises a cylindrical body 1 preferably though not necessarily built integral with the dam 2 and arranged on the lower water level side thereof. This body 1, hereinafter termed the outer cylinder, is preferably constructed of concrete or like material and is supported on the base 3 of the dam and rises to a height slightly above the high water level on the high side of the dam. The outer cylinder, as well as the inner cylinder to be described, is of large diameter approximating two hundred feet or more, though of course the diameter will be controlled more or less by the maximum length of the boats or vessels to be handled. In the wall of the outer cylinder remote from the dam there is formed an inlet opening 4 which extends sufficiently above and below the normal water level on the low side of the dam, indicated at 5, to permit free floating entrance of the maximum length vessels for which the elevator may be designed. The wall of the outer cylinder presents a substantially smooth interior and the lower limit of this inner space extends materially below the inlet opening 4.

An inner cylinder 6 is mounted for rotative movement within the outer cylinder. This inner cylinder is formed at the lower end to provide a closed float chamber 7, the center of which chamber is formed at the bottom with a recess 8 to receive a pin 9 secured to the bottom of the outer cylinder in order to maintain the inner cylinder centered with respect to the outer cylinder. The parts 8 and 9 are merely conventional and may be substituted by other conventional means, such as a trackway or the like, on which the inner cylinder may be guided in turning. The additional supporting means is not illustrated, as the parts 8 and 9 are designed to indicate any and all such means.

The upper end of the float chamber 7 is normally on a line with the bottom of the entrance 4, and rising from the top of the float chamber are spaced parallel walls 10 and 11 connected at the end remote from the low water level by a rear wall 12 and further connected at the front by a forward wall 13 which terminates at its lower end in alignment with the upper end of the entrance 4. Thus, the walls 10, 11, 12 and 13 define a space 14 having an entrance 15 which registers with the entrance 4 when the inner cylinder is in receiving position, as indicated in Figure 3. The space 14, which extends diametrically of the inner cylinder, has of course a length corresponding to the diameter of the inner cylinder, which diameter is only slightly less than that of the outer cylinder. The width of the space 14 is of course to be such as to readily accommodate the beam measurement of any vessel within the capacity of the structure. The inner cylinder has a vertical dimension slightly greater than the similar dimension of the outer cylinder, and a sufficient depth from the upper end of the inner cylinder to accommodate the draft of any and all vessels to be handled; the inner cylinder is provided with a transverse plate or wall 16 through which the space 14 communicates. The cylinder wall which extends above the transverse partition 16 has an outlet opening 17 in a position at 90 degrees or thereabouts to the entrance 15.

As thus constructed, the inner cylinder provides a float at the lower end and above the same is provided with a vertically extending chamber 14 which in one dimension is equal to the diameter of the inner cylinder and in the other dimension is of materially less dimension than the diameter of the inner cylinder. The chamber 14, hereinafter termed the elevating chamber, opens at the upper end of the inner cylinder into a maneuvering chamber which is of the full diametric dimension of the inner cylinder. The inner cylinder, between the wall 16 forming the bottom of the maneuvering chamber and the top of the float, is effectively reinforced beyond the walls 10 and 11 by appropriate uprights and bracing struts, indicated generally at 18, this reinforcing structure including annular ring-like plates 19 which project beyond the inner cylinder to a slight extent and have a guiding cooperation with the inner surface of the outer cylinder. The top of the float chamber 7 may, if desired, be formed with openings to permit the entrance of water into the float chamber during transfer of the vessels.

Surrounding the entrance 15 to the space 14 is a flange 20, designed to cooperate with the walls surrounding the inlet opening 4 of the outer cylinder when the inner cylinder is turned to seal the inlet to prevent escape of water from the inner cylinder when the latter is in operative position.

A water controlling tube 21 in open communication with the water on the high side of the dam and controlled by an appropriate gate 22 leads to and through the wall of the outer cylinder and has a lateral by-pass 23 opening into the outer cylinder within the outline of the sealing elements 20, the pipe then continuing, as at 24, and discharging into the water on the low side of the dam below the water level, with such discharge controlled by a gate 25.

The upper end of the wall of the outer cylinder is formed with an outlet 26 in open communication with a conventional lock canal 27 which leads to the upper water level, and the outlet 17 in the inner cylinder is so disposed that when the entrance 15 of the inner cylinder is in cooperation with the sealing member 20, such outlet 17 will register with the outlet 26 of the outer cylinder.

Assuming it is desired to transfer a vessel from the lower level 5 to the higher level indicated at 28. The inner cylinder is turned so that its entrance 15 registers with the entrance 4. The vessel to be transferred will then readily pass from the lower level 5 through the entrances 4 and 15 into the chamber 14. The water from the inner level flowing beneath the float 7 will tend in a measure to support the weight of the inner cylinder to reduce the effort necessary to rotate the same. The inner cylinder is then turned until its entrance 15 is sealed by the sealing flange 20 on the inner cylinder. The gate 22 is then opened and the gate 25 closed. Water from the high side of the dam will then flow in through the by-pass 23 into the chamber 14 gradually filling the latter to the level of the water on the high side of the dam. The boat or vessel within the chamber 14 is thus gradually floated upwardly until it finally reaches the maneuvering chamber above the wall 16. The vessel may then be maneuvered, if necessary, and driven under its own power or otherwise through the now registering outlets 17 and 26 and by simple operation of the lock 27, directed into the water on the high side of the dam. In transferring a vessel from the higher water level to the lower water level, the inner cylinder is turned and filled with water as previously described, if not already in this condition, the vessel to be transferred is delivered into the maneuvering chamber through the lock 27 and held in line with the chamber 14. The gate 22 is closed and the gate 25 opened, discharging the water from the chamber 14 through the by-pass 23 and to the lower water level, finally permitting the boat to move out of the now aligned entrances 15 and 4 to the water at the lower level.

In use as a fish ladder, the fish may be permitted to enter the chamber 14 and the inner cylinder and water level manipulated to raise the water level in which the fish are swimming, so that the fish will finally find their way into the maneuvering chamber and swim through the lock to the higher water level.

Of course, it is to be understood that no restriction is intended on the diameter of the cylinders or the size of the entrance openings, or the use of a single apparatus in connection with a dam. These various details may be constructed to meet the requirements of the particular use, and if necessary several of the units may be employed with a dam and the entrance openings and chamber 14 may be of such size as to insure and accommodate a large number of fish in the use of the apparatus as a fish ladder. As distinguished from the usual fish ladders, it is to be noted that the fish are always able to swim in their native element during their transference and are thus less likely to be alarmed during such transfer than would be the case where they are partly out of the water in reaching from one level to the next.

The pipe 21 is of course to be of a size to permit the flow of a sufficient volume of water to cause a comparatively rapid rise or fall in the level in the chamber 14, in order that the transfer may be carried out with as little delay as possible. If necessary, several such pipes may be employed with each apparatus.

What is claimed to be new is:

1. A combined boat elevator and fish ladder for transferring either or both from one water level on one side of a dam to the water level on the opposite side thereof, including an outer cylinder on the low water side of the dam having an entrance opening, an inner cylinder mounted for rotation within the outer cylinder and having an entrance opening to be aligned with the entrance opening in the outer cylinder, and to be sealed against water passage in another position of the inner cylinder, and a receiving chamber in the inner cylinder in communication with the entrance of that cylinder and extending upwardly and terminating in a water basin at the upper end of the inner cylinder, and means whereby the water level in the chamber in the inner cylinder may be increased or decreased at will.

2. A construction as defined in claim 1, wherein the lower end of the inner cylinder constitutes a float for substantially counterbalancing the weight of the inner cylinder.

3. A construction as defined in claim 1, wherein the outer cylinder is formed with means to seal the entrance to the inner cylinder when the latter has been turned to a predetermined position.

4. A combined boat elevator and fish ladder, including a cylinder having a vertically extending receiving chamber terminating at the lower end in an entrance opening in communication with a lower water level, means at the upper end of the chamber in communication with a higher water level, means for rotating the cylinder to open the entrance opening to a body of water at a lower level or seal said entrance opening against the flow of water, means responsive to the rotation of the cylinder to open or close the entrance opening to the cylinder in accordance with cylinder positions, said means serving when the cylinder has been rotated to a position to close the entrance opening to permit a raising of the water level in the cylinder from the higher water level source to float a boat or fish within the cylinder to a higher level and serving when the cylinder has been rotated to a position to open the entrance opening to permit the fall of the level of water in the cylinder to lower a boat or fish.

5. A construction as defined in claim 4, wherein the chamber in the cylinder is of materially less width than the diameter of the cylinder.

6. A construction as defined in claim 4, wherein the upper end of the cylinder is formed as a water chamber in open communication with the vertical chamber in the cylinder and of the full diameter of the cylinder.

7. A construction as defined in claim 1, wherein the means for varying the water level in the chamber of the inner cylinder includes a pipe open at one end to the high water level and at the opposite end to the low water level, with gates controlling each end and a by-pass leading from the pipe into the chamber of the inner cylinder when the entrance opening of the latter is sealed against water from the lower level.

8. A construction as defined in claim 1, wherein the lower end of the inner cylinder constitutes a float and is provided with means carried by the outer cylinder to guide the inner cylinder in rotation.

RAY L. WATERS.